(No Model.)
J. C. W. FORRESTER.
Refrigerator.
No. 232,341. Patented Sept. 21, 1880.
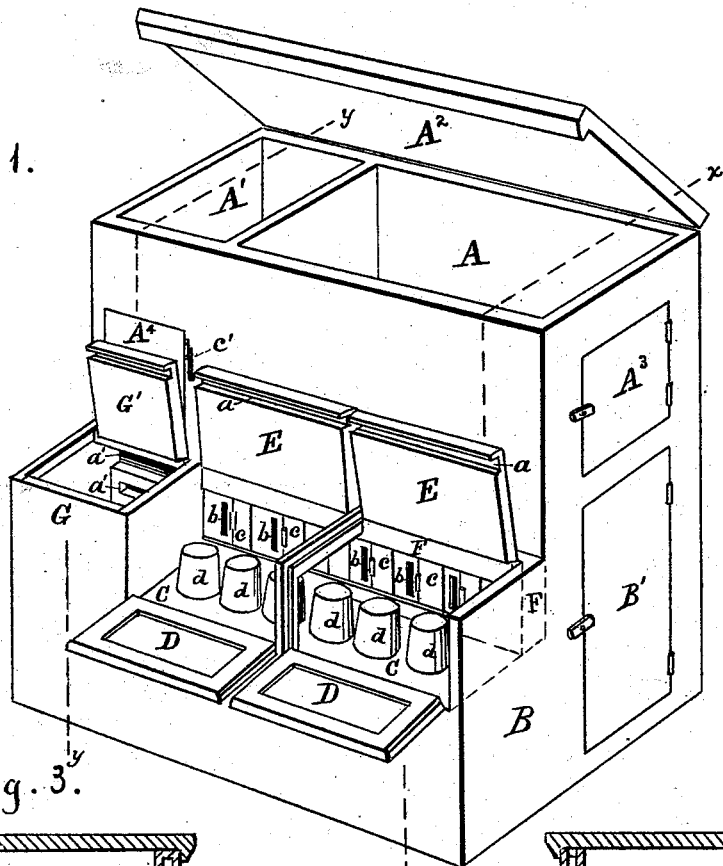
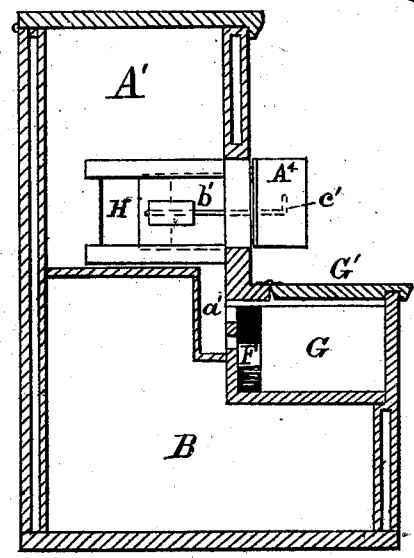
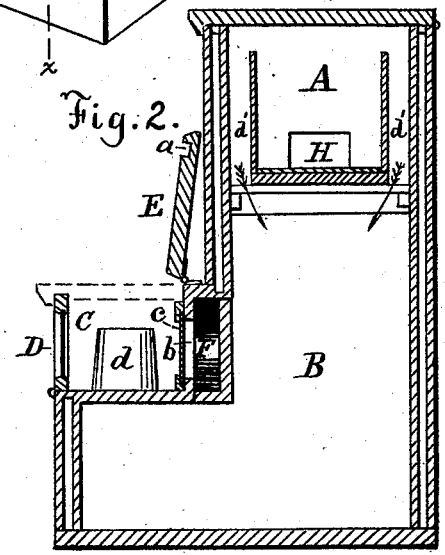
Witnesses:
H. A. Daniels
W. B. Hale
Inventor:
John C. W. Forrester
By W. Burris
Attorney

United States Patent Office.

JOHN C. W. FORRESTER, OF BOSTON, MASSACHUSETTS.

REFRIGERATOR.

SPECIFICATION forming part of Letters Patent No. 232,341, dated September 21, 1880.

Application filed June 10, 1880. (No model.)

*To all whom it may concern:*

Be it known that I, JOHN C. W. FORRRESTER, commission merchant, of Boston, in the county of Suffolk and State of Massachusetts, have invented certain new and useful Improvements in Butter-Refrigerators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists of a combined refrigerator, butter-room, cutting-apartments, and storage-room annexed to the ice-chambers, having cold-air conductors provided with openings and valves arranged to concentrate and regulate the cold air from the ice-chambers upon the butter in the cutting-apartments and storage-room, as shown in the drawings, and hereinafter fully described.

In the drawings, Figure 1 is a perspective view. Fig. 2 is a vertical section on line $x\,x$, and Fig. 3 is a vertical section on line $y\,y$ of Fig. 1, looking in both sections toward the center of the refrigerator.

A represents an ice-chamber, arranged above the butter-room. At one end of this ice-chamber is a smaller chamber, A', forming a receptacle for ice for cooling the storage room. These ice-chambers are covered by the hinged lid $A^2$ and are provided with the doors $A^3\,A^4$.

B represents the butter-room under the ice-chamber A, and is provided with the hinged door B'.

C C designate the cutting-apartments in front of the butter-room, and are deep enough to contain a single row of butter-tubs. These apartments are provided with front glass doors, D D, hinged at the bottom to open downward, and with lids E E, hinged at the back to be raised up against the front of the ice-chamber. These lids are provided with grooves $a$ to fit over and hold in place the doors D when the apartments are closed.

F designates an air-passage to conduct the cold air from the ice-chambers to the cutting and storage apartments, which passage is provided with openings $b$, having slide-valves $c$, to conduct and regulate the cold air upon the butter-tubs $d$ in the cutting-apartments.

G is an apartment for storing parcels of butter for keeping them cool while waiting to be sent to the purchasers. This apartment is provided with a hinged lid, G', and with openings $a'$ to admit cold air from the ice-chamber A'.

H is an opening in the partition between the ice-chambers A and A', provided with a slide-valve, $b'$, to which is attached a wire, $c'$, extended through the front wall of the ice-chamber for operating the slide-valve to admit, when required, the cold air from the ice-chamber A into the air-passage F to concentrate the whole force of the cold air upon the butter in the cutting-apartments. On each side of the bottom of the ice-chamber A are openings $d'$, to permit the cold air to descend into the butter-room, as shown by the arrows in Fig. 2 of the drawings.

For the purpose of economizing room in market-stalls the ice-chamber may be constructed over the cutting and storage apartments, and the butter-room and ice-room at the end may be dispensed with; but where there is sufficient space the construction shown and described is preferred.

The chambers A A' being supplied with ice and warm air admitted, currents of cold air are forced through the passage F and openings $b$ into the cutting-apartments upon the butter and through openings $a'$ into the storage-room.

It is evident that by this construction the cold air may be concentrated upon the butter in the cutting-apartments, a current being thrown directly upon each roll or tub of butter; and when the cold air may not be needed in the butter-room the cold air from the chamber A is allowed to pass into chamber A' by pulling out the wire $c'$, and the whole force of the cold air from both ice-chambers may thus be thrown upon the butter in the cutting-apartments; and when the soft condition of the butter in any one tub may require it, the whole of the cold air may be concentrated upon that one tub by closing the openings opposite the other tubs.

This arrangement, by which the butter and cutting apartments are combined in one refrigerator, and the cold air is concentrated upon each tub of butter, dispenses with the necessity of two separate refrigerators and saves about forty per cent. of room and ice.

What I claim as new, and desire to secure by Letters Patent, is—

1. The combined refrigerator, cutting-apartments, and storage-room, consisting of the ice-chambers A A', cutting-apartments C C, and storage-room G, connected with the ice-chambers by the air-passage F, provided with the openings $b$, having slide-valves $c$ and openings $a'$, substantially as and for the purposes described.

2. The combined refrigerator, butter-room, cutting-apartments, and storage-room, consisting of the ice-chambers A A', butter-room B, cutting-apartments C C, and storage-room G, and having the air-passage F, openings $a'$ $b$, and slide-valves $c$, substantially as and for the purposes described.

In testimony that I claim the foregoing as my own invention I affix my signature in presence of two witnesses.

JOHN C. W. FORRESTER.

Witnesses:
SETH E. BROWN,
BENJAMIN POND.